(12) United States Patent
Ahn et al.

(10) Patent No.: US 12,062,149 B2
(45) Date of Patent: Aug. 13, 2024

(54) PROJECTION IMAGE DISPLAY CONTROL APPARATUS AND METHOD

(71) Applicant: HYUNDAI MOBIS CO., LTD., Seoul (KR)

(72) Inventors: Sung Joon Ahn, Seongnam-si (KR); Tae Hun Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 170 days.

(21) Appl. No.: 17/667,747

(22) Filed: Feb. 9, 2022

(65) Prior Publication Data

US 2022/0253971 A1 Aug. 11, 2022

(30) Foreign Application Priority Data

Feb. 9, 2021 (KR) .................. 10-2021-0018694

(51) Int. Cl.
*G06F 3/01* (2006.01)
*G06T 3/08* (2024.01)
*G06T 15/80* (2011.01)

(52) U.S. Cl.
CPC ............ *G06T 3/08* (2024.01); *G06F 3/017* (2013.01); *G06T 15/80* (2013.01)

(58) Field of Classification Search
CPC ................................ G06T 3/005; G06F 3/01
See application file for complete search history.

(56) References Cited

U.S. PATENT DOCUMENTS

| 9,547,412 | B1 * | 1/2017 | Dillon | ................ G06F 3/011 |
| 2006/0244734 | A1 * | 11/2006 | Hill | ................ G06F 3/0412 345/173 |

OTHER PUBLICATIONS

Audet, Samuel, and Jeremy R. Cooperstock. "Shadow removal in front projection environments using object tracking." 2007 IEEE conference on computer vision and pattern recognition. IEEE (Year: 2007).*

* cited by examiner

*Primary Examiner* — Diane M Wills
(74) *Attorney, Agent, or Firm* — Novo TechIP International PLLC

(57) ABSTRACT

A projection image display control apparatus may include: an input unit configured to receive projection image information and manipulation information; a memory configured to store a program for controlling a projection image display by using the projection image information and the manipulation information; and a processor configured to execute the program, wherein the processor identifies a manipulation target object within the projection image by using the manipulation information, determines whether the manipulation target object is included in a shadow, and transmits a command signal to change a UI of the manipulation target object included in the shadow.

10 Claims, 20 Drawing Sheets

210

PROJECTION IMAGE DISPLAY CONTROL APPARATUS AND METHOD

CROSS-REFERENCE TO RELATED APPLICATIONS

This application claims the benefit under 35 USC § 119(a) of Korean Patent Application No. 10-2021-0018694, filed on Feb. 9, 2021 in the Korean Intellectual Property Office, the entire disclosure of which is incorporated herein by reference for all purposes.

BACKGROUND

1. Technical Field

The present disclosure relates to a projection image display control apparatus and method.

2. Discussion of Related Art

With the increase in size of a display within a vehicle, more and more attempts have been made to utilize, as the display, a windshield and window as well as a general display such as an LCD or OLED, mounted on a cockpit.

According to the related art, when the windshield and the window are utilized as the display, a projection image provided through an electrochromic film and a projector are utilized, and manipulated through a method using an air gesture.

With the development of technology such as autonomous driving, the interior structure of a vehicle has been changed to various shapes. In such an environment, any structures in the interior space of the vehicle may be utilized as displays, and various manipulations may be performed.

When a manipulation signal such as a touch is inputted to contents within the projection image according to the related art in case that the projection image is utilized, a shadow may appear on a projection image screen depending on the position of a light source of the projector. In this case, the contents corresponding to the manipulation target may be covered by the shadow.

SUMMARY

Various embodiments are directed to a projection image display control apparatus and method which can provide a user interface (UI) feedback to avoid a shadow that occurs when contents (object) within a projection image are manipulated (touched), thereby enabling a user to intuitively and conveniently manipulate the contents within the projection image.

In an embodiment, a projection image display control apparatus may include: an input unit configured to receive projection image information and manipulation data; a memory configured to store a program for controlling a projection image display by using the projection image information and the manipulation data; and a processor configured to execute the program, wherein the processor identifies a manipulation target object within the projection image by using the manipulation data, determines whether the manipulation target object is included in a shadow, and transmits a command signal to change a UI of the manipulation target object included in the shadow.

The input unit may receive the manipulation data generated by sensing a user's gesture.

The processor may determine whether the manipulation target object is included in a shadow which appears according to the position of the projector.

The processor may transmit the command signal to change at least any one of the position and shape of the manipulation target object.

When transmitting the command signal to change the position of the manipulation target object, the processor may transmit the command signal to change the position of the manipulation target object to a preset position in consideration of the position of the shadow.

The processor may transmit the command signal including a command to change the position of an object other than the manipulation target object.

In an embodiment, a projection image display control method may include the steps of: (a) checking a manipulation intention for an object within a projection image; and (b) performing UI feedback control by transmitting a command signal to adjust a UI for the object, when the object is included in a shadow.

The step (a) may include checking the manipulation intention for the object by sensing a user's gesture.

The step (b) may include sensing that the object is included in a shadow which appears according to the position of a projector, and transmitting the command signal to change at least any one of the position and shape of the object.

The step (b) may include transmitting the command signal to change the position of the object to a preset position in consideration of the position of the shadow, when changing the position of the object.

The step (b) may include transmitting the command signal including a command to change the position of an object other than the object.

In accordance with the embodiment of the present disclosure, the projection image display control apparatus and method may provide a user interface (UI) feedback in consideration of a shadow that occurs when contents within a projection image are manipulated through a touch, thereby preventing manipulation target contents from being blocked by the shadow. Thus, the projection image display control apparatus and method may enable a user to intuitively and conveniently manipulate the projection image.

The effects of the present disclosure are not limited to the above-mentioned effects, and the other effects which are not mentioned herein will be clearly understood from the following descriptions by those skilled in the art.

DETAILED DESCRIPTION

In addition to the above-described purpose and other purposes, the advantages and characteristics of the present disclosure and a method for achieving the advantages and characteristics will be clearly understood through the following embodiments with reference to the accompanying drawings.

However, the present disclosure is not limited to the following embodiments, but may be implemented in various shapes different from each other, and the following embodiments are only provided to easily deliver the purposes, configurations and effects of the present disclosure to those skilled in the art to which the present disclosure pertains. Therefore, the scope of the present disclosure is defined by the claims.

Terms used in this specification are used for describing exemplary embodiments while not limiting the present disclosure. The terms of a singular form may include plural forms unless particularly mentioned. The meaning of 'comprise' and 'comprising' used in the specification specifies a component, step, operation, and/or element but does not exclude the presence or addition of other components, steps, operations, and/or elements.

Figure 1:
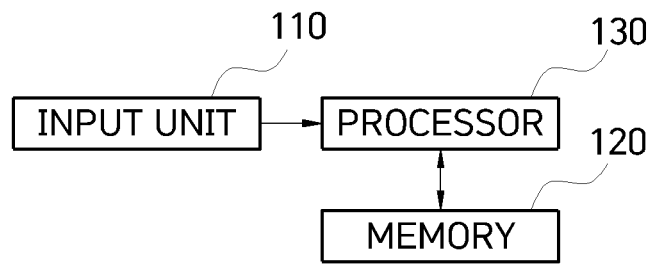
FIG. 1 is a diagram illustrating a projection image display control apparatus in accordance with an embodiment of the present disclosure.

FIG. 1 is a diagram illustrating a projection image display control apparatus in accordance with an embodiment of the present disclosure.

The projection image display control apparatus in accordance with the embodiment of the present disclosure includes an input unit 110 configured to receive projection image information and manipulation data, a memory 120 configured to store a program for controlling a projection image display by using the projection image information and the manipulation data, and a processor 130 configured to execute the program. The processor 130 may identify a manipulation target object within a projection image by using the manipulation data, determine whether the manipulation target object is included in a shadow, and transmit a command signal to change a UI of the manipulation target object included in the shadow.

The input unit 110 receives manipulation data generated by sensing a user's gesture.

At this time, a sensor for sensing the user's gesture can sense a manipulation intention for an object at a specific position. For another example, the sensor can check a manipulation intention for an object at a specific position from an image of a camera which captures a projection area.

The processor 130 determines whether a manipulation target object is included in a shadow which appears depending on the position of a projector.

The processor 130 transmits a command signal to change at least any one of the position and shape of the manipulation target object.

When transmitting the command signal to change the position of the manipulation target object, the processor 130 transmits the command signal to change the position of the manipulation target object to a preset position in consideration of the position of the shadow.

The processor 130 transmits the command signal including a command to change the position of an object other than the manipulation target object.

FIGS. 2A to 2C and 3 illustrate the mounting positions of projectors in accordance with an embodiment of the present disclosure.

The projector in accordance with the embodiment of the present disclosure may be mounted at various positions within the vehicle, and provides a user interface (UI) feedback for avoiding a shadow which inevitably appears when a projection image is manipulated according to a projection position for an optimal image.

Figure 2A:
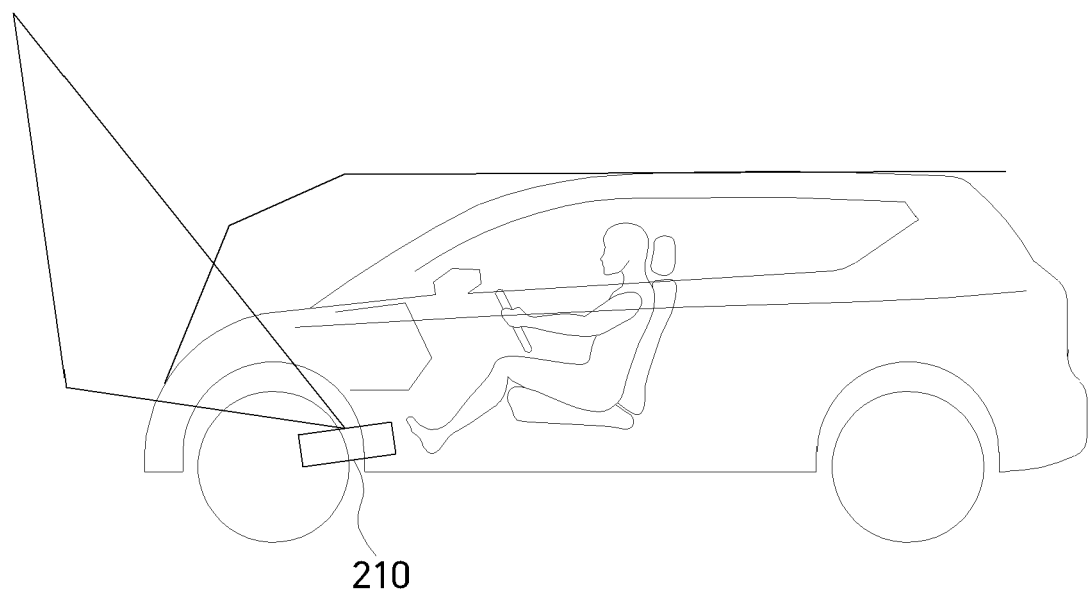
FIGS. 2A to 2C and 3 illustrate the mounting positions of projectors in accordance with an embodiment of the present disclosure.
Figure 2B:
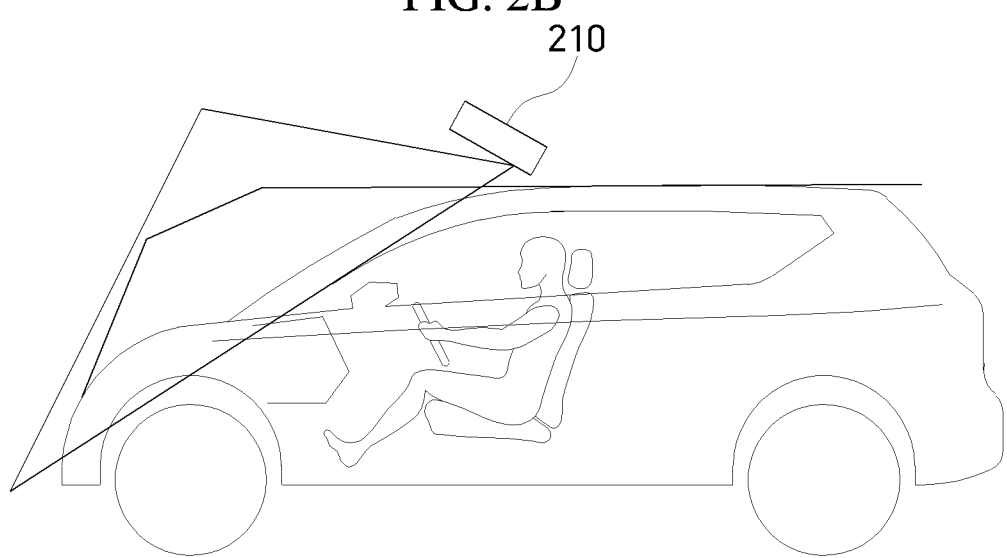
Figure 2C:
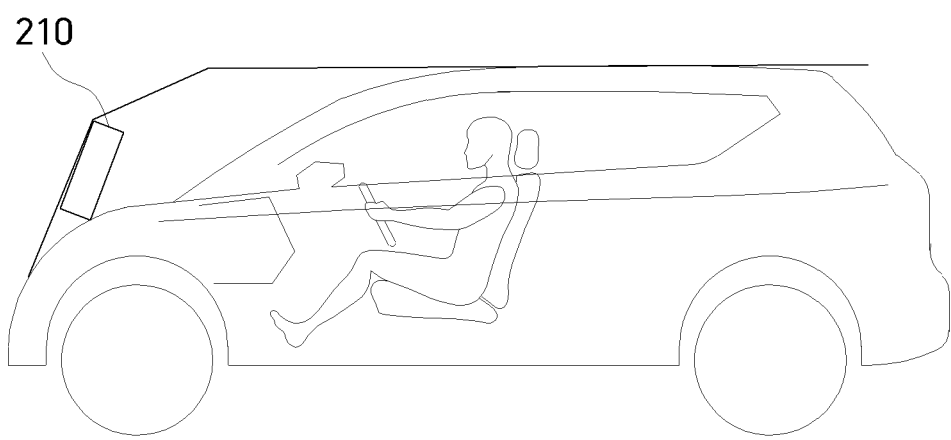

FIG. 2A illustrates that a projector 210 may be mounted at the bottom of a vehicle body, FIG. 2B illustrates that the projector 210 may be mounted at the top of the vehicle body, and FIG. 2C illustrates that the projector 210 may be mounted at a side surface of the vehicle body.

Figure 3:
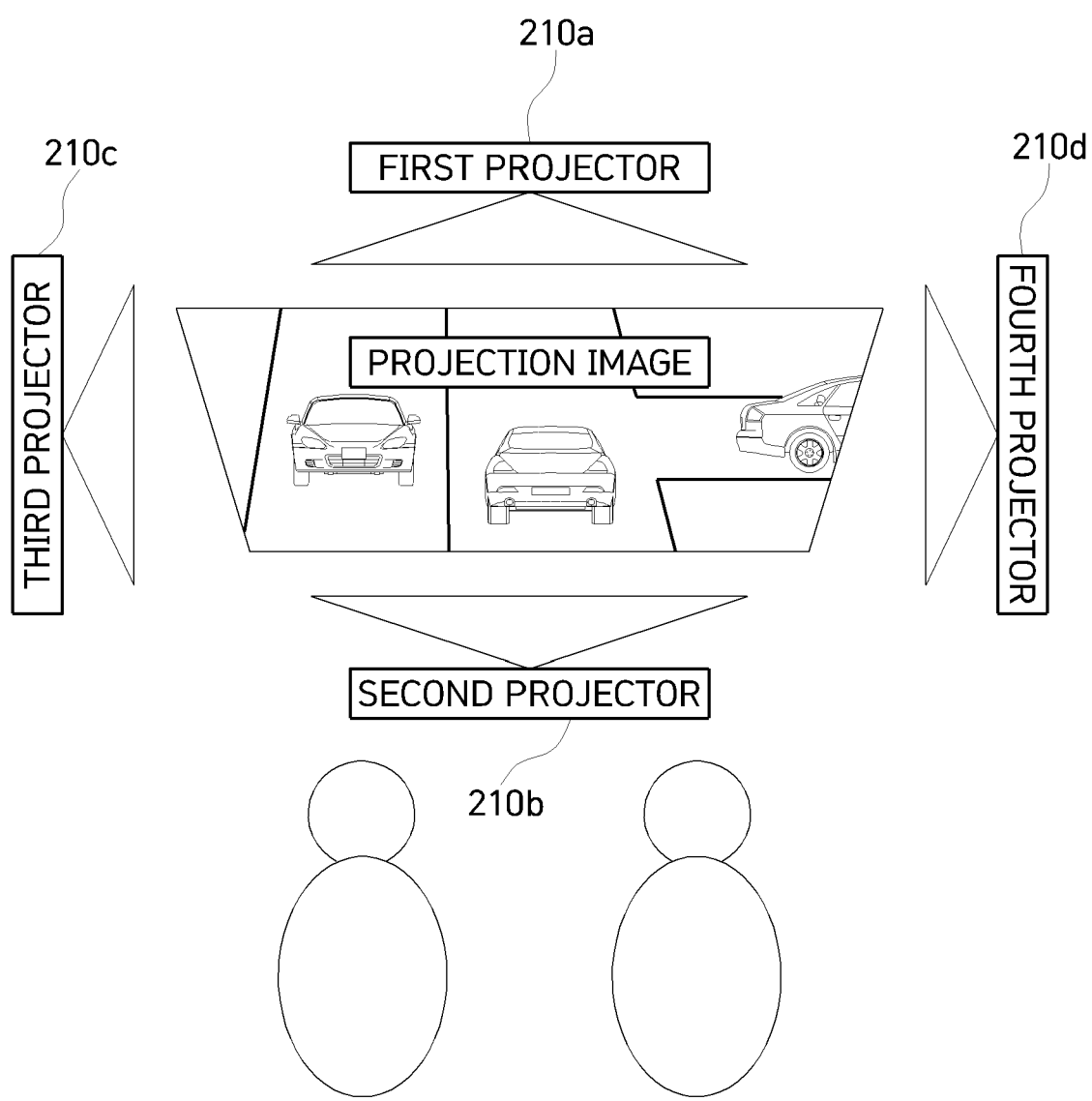

As illustrated in FIG. 3, a first projector 210a may project an image from top to bottom, a second projector 210b may project an image from bottom to top, a third projector 210c may project an image from left to right, and a fourth projector 210d may project an image from right to left.

FIGS. 4A to 4D are diagrams illustrating a shadow which appears when a projection image in accordance with the embodiment of the present disclosure is used.

Figure 4A:
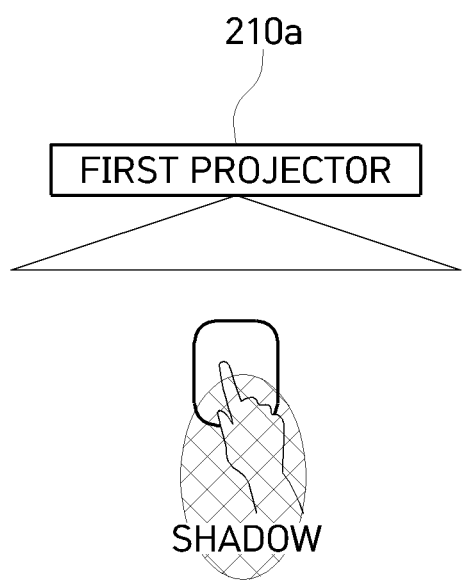
FIGS. 4A to 4D are diagrams illustrating a shadow which appears when a projection image in accordance with the embodiment of the present disclosure is used.

Referring to FIG. 4A, when the first projector 210a projects an image from top to bottom and a user selects a specific object within the projection image through a touch manipulation using his/her hand, a shadow is formed in a direction from top to bottom.

Figure 4B:
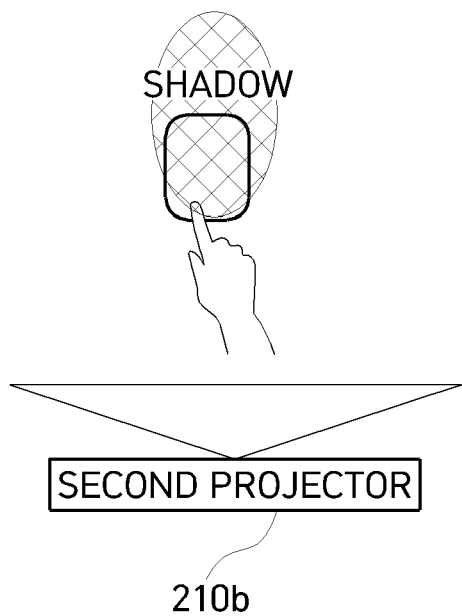

Referring to FIG. 4B, when the second projector 210b projects an image from bottom to top and the user selects a specific object within the projection image through a touch manipulation using his/her hand, a shadow is formed in a direction from bottom to top.

Figure 4C:
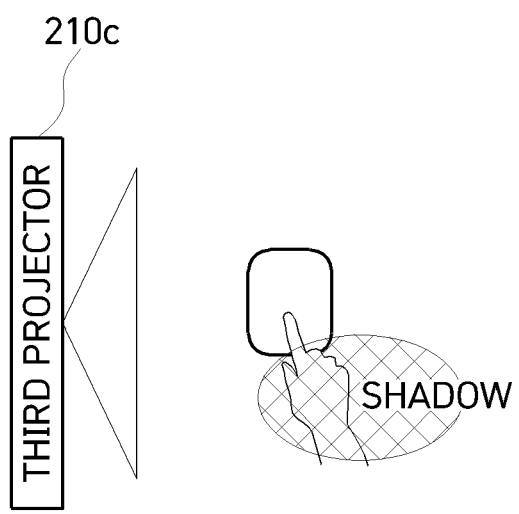

Referring to FIG. 4C, when the third projector 210c projects an image from left to right and the user selects a specific object within the projection image through a touch manipulation using his/her hand, a shadow is formed in a direction from left to right.

Figure 4D:
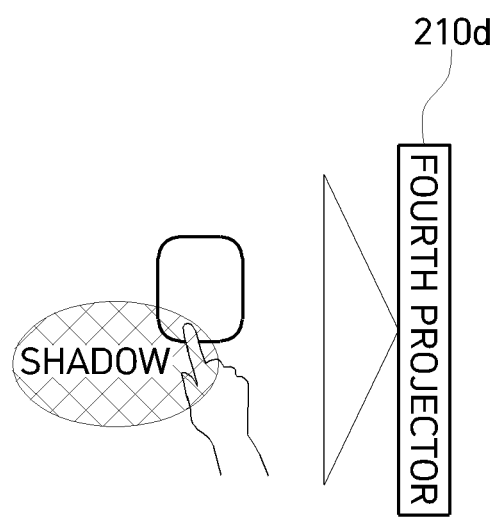

Referring to FIG. 4D, when the fourth projector 210d projects an image from right to left and the user selects a specific object within the projection image through a touch manipulation using his/her hand, a shadow is formed in a direction from right to left.

FIGS. 5A to 5D, 6 and 7 illustrate UI feedbacks provided through projection image display control in accordance with the embodiment of the present disclosure.

In accordance with the embodiment of the present disclosure, the processor 130 modifies the UI of contents (icon or the like), which is to be manipulated (touched) within a projection image, by using projection image information and object manipulation data within the projection image, and transmits a command signal to apply a movement effect, and the projector projects an image by implementing a UI modification and movement effect according to the command signal.

At this time, when implementing the UI modification and movement effect, the projector preferentially assigns the effect to manipulation target contents (icon) at a short distance, such that the user can intuitively recognize the UI modification and movement effect.

Figure 5A:
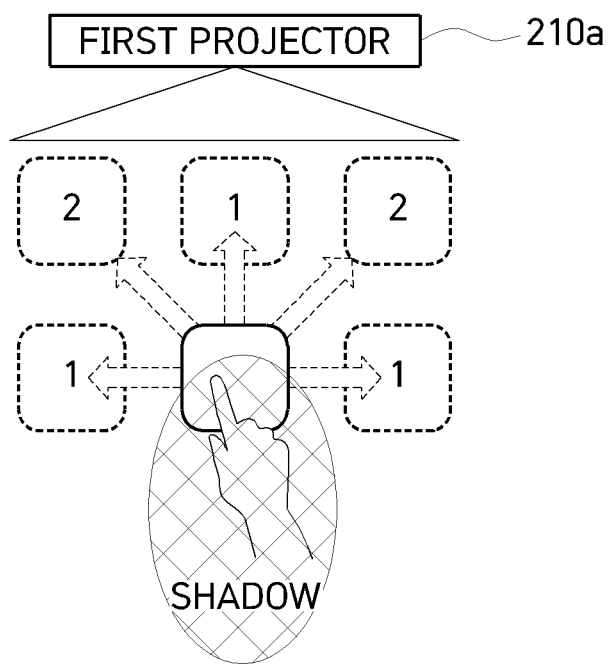
FIGS. 5A to 5D, 6A, 6B and 7A to 7D illustrate UI feedbacks provided through projection image display control in accordance with the embodiment of the present disclosure.

Referring to FIG. 5A, when the first projector 210a projects an image from top to bottom and a user selects a specific object 1 within the projection image through a touch manipulation using his/her hand, a shadow is formed in a direction from top to bottom, and a part of the manipulation target specific object 1 is included in the shadow. Thus, according to the command signal transmitted from the processor 130, the position of the manipulation target specific object 1 is moved to the top, the left or the right, such that the manipulation target specific object 1 is not blocked by the shadow.

At this time, the manipulation target specific object 1 may not be moved to the top, the left or the right at a short distance, but be moved to the left top or the right top.

At this time, since the shadow moves along with the movement of the user's hand, the processor 130 transmits a command signal to properly change the position of the manipulation target specific object 1, such that the manipulation target specific object 1 can be manipulated (touched) by the user's hand, while not being blocked by the shadow as much as possible.

Furthermore, as the position of the manipulation target specific object 1 is moved, the position of an object around the manipulation target specific object 1 is moved in connection with the position movement of the manipulation target specific object 1.

Figure 5B:
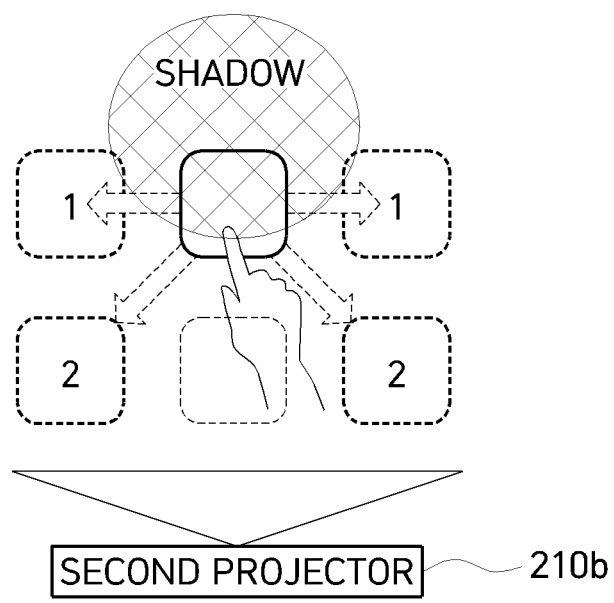

Referring to FIG. 5B, when the second projector 210*b* projects an image from bottom to top and the user selects the specific object 1 within the projection image through a touch manipulation using his/her hand, a shadow is formed in a direction from bottom to top, and a part of the manipulation target specific object 1 is included in the shadow. Thus, according to the command signal transmitted from the processor 130, the position of the manipulation target specific object 1 is moved to the left or the right, such that the manipulation target specific object 1 is not blocked by the shadow.

At this time, the manipulation target specific object 1 may not be moved to the left or the right at a short distance, but be moved to the left bottom or the right bottom.

Figure 5C:
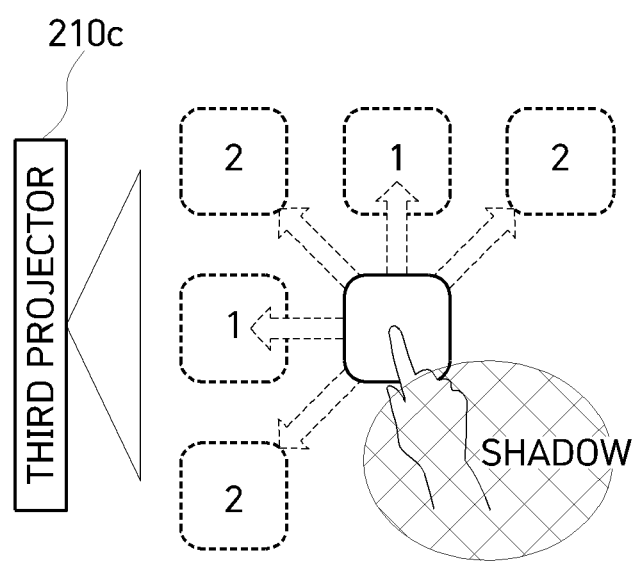

Referring to FIG. 5C, when the third projector 210*c* projects an image from left to right and the user selects a specific object within the projection image through a touch manipulation using his/her hand, a shadow is formed in a direction from left and right bottom, and a part of the manipulation target specific object 1 is included in the shadow. Thus, according to the command signal transmitted from the processor 130, the position of the manipulation target specific object 1 is moved to the top or the left, such that the manipulation target specific object 1 is not blocked by the shadow.

At this time, the manipulation target specific object 1 may not be moved to the top or the left at a short distance, but be moved to the left top, the right top or the left bottom.

Figure 5D:
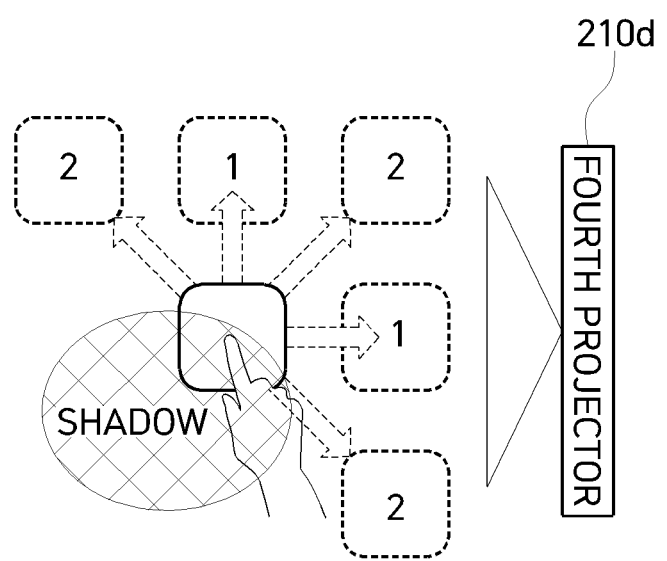

Referring to FIG. 5D, when the fourth projector 210*d* projects an image from right to left and the user selects a specific object within the projection image through a touch manipulation using his/her hand, a shadow is formed in a direction from right to left bottom, and a part of the manipulation target specific object 1 is included in the shadow. Thus, according to the command signal transmitted from the processor 130, the position of the manipulation target specific object 1 is moved to the top or the right, such that the manipulation target specific object 1 is not blocked by the shadow.

At this time, the manipulation target specific object 1 may not be moved to the top or the rear at a short distance, but be moved to the left top, the right top or the left bottom.

Figure 6A:
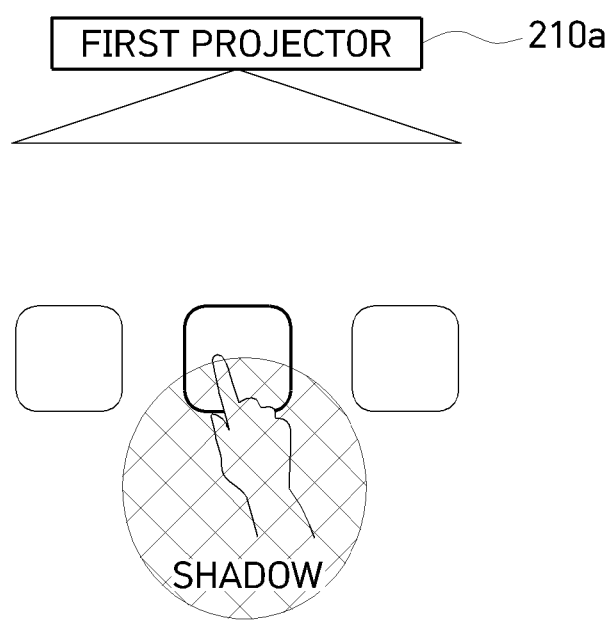
Figure 6B:
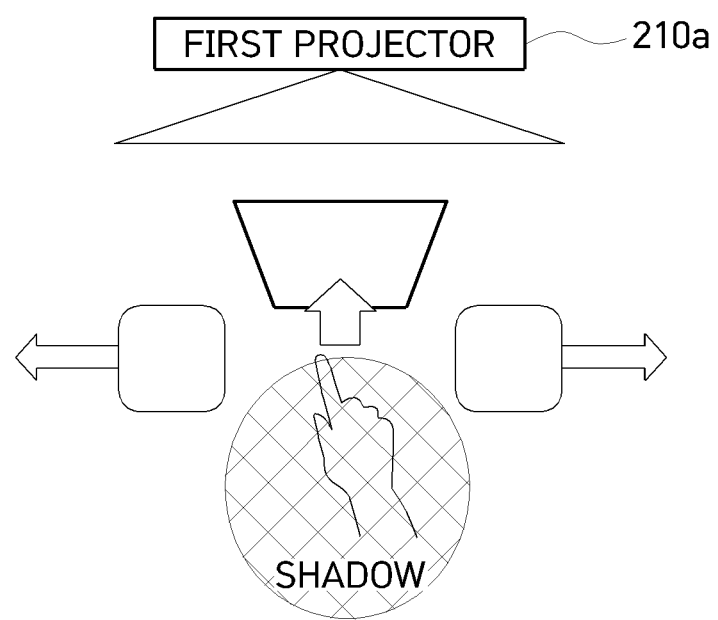

Referring to FIG. 6, when the first projector 210*a* projects an image from top to bottom and a user selects a specific object within the projection image through a touch manipulation using his/her hand, a shadow is formed in a direction from top to bottom, and a part of the manipulation target specific object is included in the shadow. Thus, according to the command signal transmitted from the processor 130, the position of the manipulation target object is moved to the top, and the shape of an icon is modified. At this time, at least one of the shape and size of the icon may be modified.

Furthermore, the positions of other objects around the manipulation target specific object are changed to escape from the shadow, in connection with the change in at least one of the position and shape of the manipulation target specific object.

Referring to FIGS. 7A to 7D, the first projector 210*a* projects an image from top to bottom.

As the user's hand moves as illustrated in FIGS. 7A to 7D, a shadow area moves together.

Figure 7A:
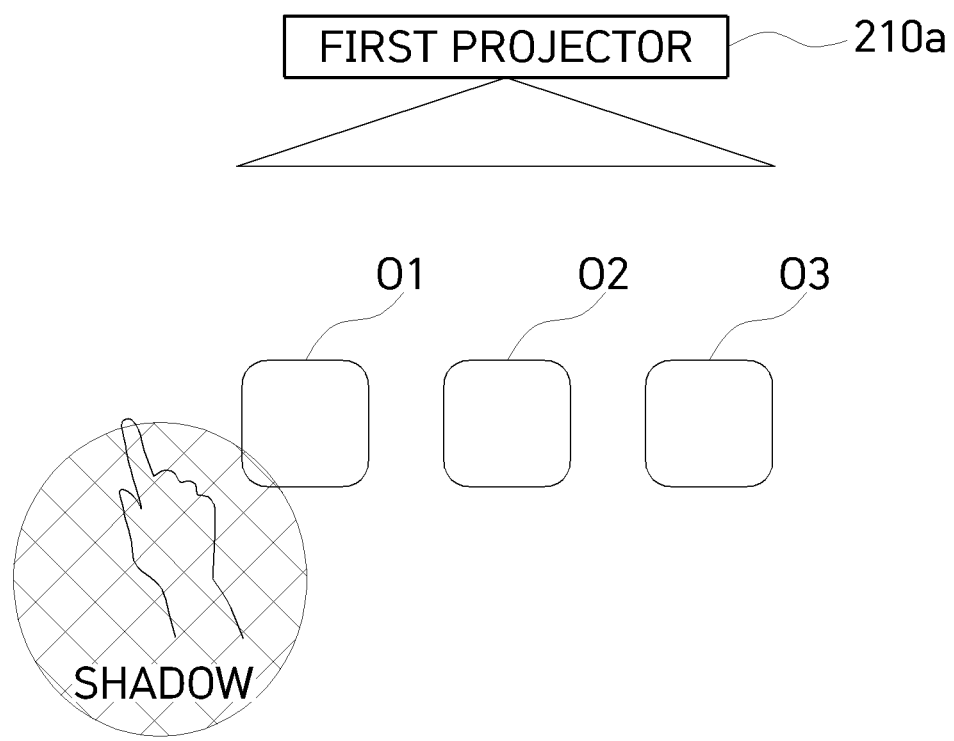
Figure 7B:
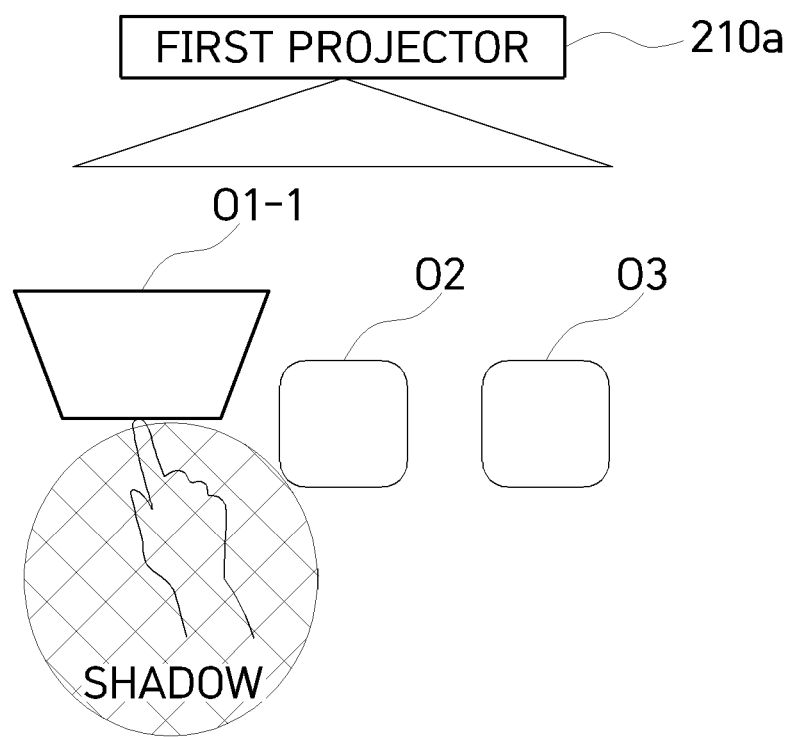

Referring to FIGS. 7A and 7B, a first object O1 is located in the shadow by the user's hand. Thus, according to a command signal of the processor, the position and shape of the first object O1 are changed (O1-1).

Figure 7C:
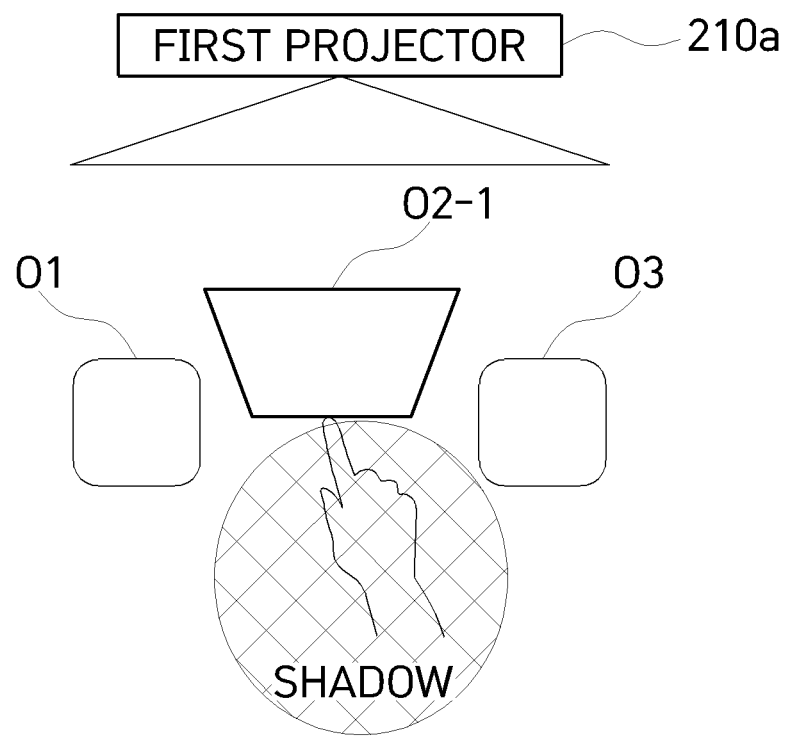

Referring to FIG. 7C, a second object O2 is located in a shadow by the user's hand. Thus, according to the command signal of the processor, the position and shape of the second object O2 are changed (O2-1).

Figure 7D:
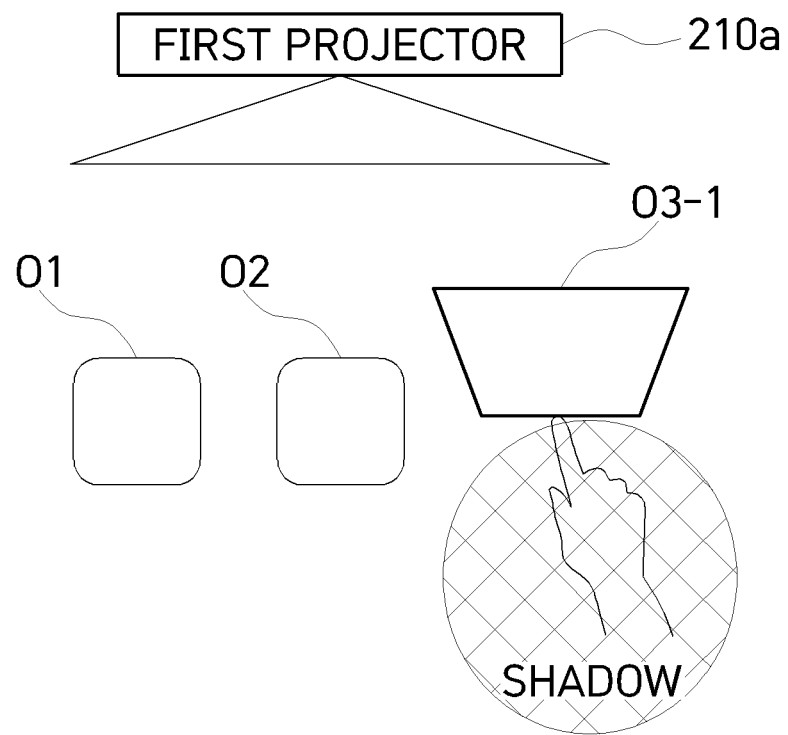

Referring to FIG. 7D, a third object O3 is located in the shadow by the user's hand. Thus, according to the command signal of the processor, the position and shape of the third object O3 are changed (O3-1).

Figure 8:
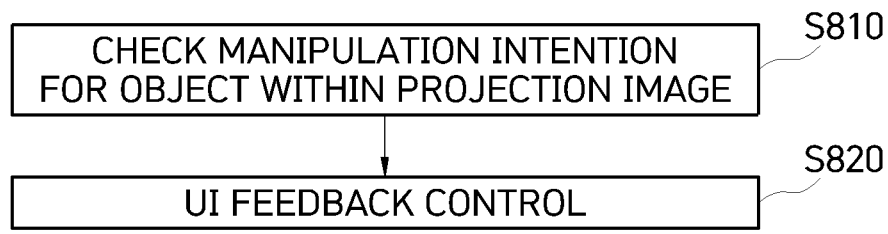
FIG. 8 is a flowchart illustrating a projection image display control method in accordance with an embodiment of the present disclosure.

FIG. 8 is a flowchart illustrating a projection image display control method in accordance with an embodiment of the present disclosure.

The projection image display control method in accordance with the embodiment of the present disclosure includes step S810 of checking a manipulation intention for an object within a projection image and step S820 of performing UI feedback control by transmitting a command signal to adjust a UI for the object when the object is included in a shadow.

Step S810 includes checking the manipulation intention for the object by sensing a user's gesture.

Step S820 includes sensing that the object is included in a shadow which appears according to the position of a projector, and transmitting the command signal to change at least one of the position and shape of the object.

Step S820 includes transmitting a command signal to change the position of the object to a preset position in consideration of the position of the shadow when the position of the object is changed.

Step S820 includes transmitting the command signal including a command to change the position of an object other than the object.

The projection image display control method in accordance with the embodiment of the present disclosure may be implemented in a computer system or recorded in a recording medium. The computer system may include one or more processors, a memory, a user input device, a data communication bus, a user output device and a storage place. The above-described components perform data communication through a data communication bus.

The computer system may further include a network interface coupled to a network. The processor may be a CPU (Central Processing Unit), or a semiconductor device configured to process a command stored in the memory and/or the storage place.

The memory and the storage place may include various types of volatile or nonvolatile storage media. Examples of the memory may include ROM (Read Only Memory) and RAM (Random Access Memory).

Therefore, the projection image display control method in accordance with the embodiment of the present disclosure may be implemented as a method which can be executed in a computer. When the projection image display control method in accordance with the embodiment of the present disclosure is performed in a computer device, computer readable commands may perform the projection image display control method in accordance with the present disclosure.

The projection image display control method in accordance with the present disclosure may be implemented as computer readable codes in a computer readable recording medium. The computer readable recording medium includes all types of recording media storing data which can be read by a computer system. Examples of the computer readable recording media may include ROM, RAM, magnetic tape, magnetic disk, flash memory, optical data storage device and the like. Furthermore, the computer readable recording media may be stored and executed as codes which may be distributed to computer systems connected through a computer communication network and read in a distributed manner.

What is claimed is:

1. A system for controlling display of a user interface (UI) image projected from a projector, the system comprising:
   a processor; and
   a computer-readable medium in communication with the processor and storing instructions that, when executed by the processor, cause the processor to control the system to perform:
      detecting a user's gesture with respect to the UI image projected in front of the user, the UI image containing one or more objects including a first object;
      determining, based on the detected user's gesture, that the user intends to manipulate the first object;
      in response to determining that the user intends to manipulate the first object of the UI image, determining whether the user's shadow at least partially overlaps the first object when the user is gesturing to manipulate the first object; and
      in response to determining that the user's shadow at least partially overlaps the first object, modifying the UI image such that the first object is not overlapped by the user's shadow.

2. The system of claim 1, wherein the user's shadow is caused by the user's body portion gesturing between the projector and the projected UI image.

3. The system of claim 1, wherein, for modifying the UI image, the instructions, when executed by the processor, further cause the processor to control the system to perform changing at least one of a position and shape of the first object.

4. The system of claim 3, wherein, for modifying the UI image, the instructions, when executed by the processor, further cause the processor to control the system to perform moving the first object to a first new location on the UI image based on a position of the user's shadow.

5. The system of claim 3, wherein:
   the one or more objects of the UI image further includes a second object, and
   for modifying the UI image, the instructions, when executed by the processor, further cause the processor to control the system to perform moving the second object to a second new location on the UI image.

6. A method of controlling display of a user interface (UI) image projected from a projector, the method comprising:
   detecting a user's gesture with respect to the UI image projected in front of the user, the UI image containing one or more objects including a first object;
   determining, based on the detected user's gesture, that the user intends to manipulate the first object;
   in response to determining that the user intends to manipulate the first object of the UI image, determining whether the user's shadow at least partially overlaps the first object when the user is gesturing to manipulate the first object; and
   in response to determining that the user's shadow at least partially overlaps the first object, modifying the UI image such that the first object is not overlapped by the user's shadow.

7. The method of claim 6, wherein the user's shadow is caused by the user's body portion gesturing between the projector and the projected UI image.

8. The method of claim 6, wherein modifying the UI image comprises changing at least one of a position and shape of the first object.

9. The method of claim 8, wherein modifying the UI image comprises moving the first object to a first new location on the UI image based on a position of the shadow.

10. The method of claim 8, wherein:
    the one or more objects of the UI image further includes a second object, and
    modifying the UI image comprises moving the second object to a second new location on the UI image.

* * * * *